(12) United States Patent
Hedrick et al.

(10) Patent No.: US 7,059,278 B2
(45) Date of Patent: Jun. 13, 2006

(54) LOCOMOTIVE ENGINE CHARGE AIR COOLING SYSTEM AND METHOD FOR COOLING THE ENGINE

(75) Inventors: John C. Hedrick, Boerne, TX (US);
Steven G. Fritz, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 64 days.

(21) Appl. No.: 11/005,701

(22) Filed: Dec. 6, 2004

(65) Prior Publication Data

US 2005/0193963 A1 Sep. 8, 2005

Related U.S. Application Data

(60) Provisional application No. 60/551,258, filed on Mar. 8, 2004.

(51) Int. Cl.
*F01P 5/10* (2006.01)
*F01P 1/06* (2006.01)

(52) U.S. Cl. ............................ 123/41.14; 123/41.31; 123/41.44; 60/599

(58) Field of Classification Search ............ 123/41.14, 123/41.31, 41.44, 41.33, 563, 196 AB; 60/599
See application file for complete search history.

(56) References Cited

U.S. PATENT DOCUMENTS 4,207,848 A * 6/1980 Dinger et al. ............... 123/556
5,910,099 A * 6/1999 Jordan et al. ................ 60/599
6,006,731 A * 12/1999 Uzkan ......................... 123/563
6,499,298 B1 * 12/2002 Uzkan .......................... 60/599
6,883,315 B1 * 4/2005 Shakenis et al. .............. 60/599

* cited by examiner

*Primary Examiner*—Henry C. Yuen
*Assistant Examiner*—Hyder Ali
(74) *Attorney, Agent, or Firm*—Gunn & Lee, P.C.; Ted D. Lee

(57) ABSTRACT

A locomotive engine having an engine cooling system, a compressor for compressing engine intake air, and an aftercooler for cooling the compressed intake air prior to introduction into an intake manifold of the engine. The locomotive also has a dynamic brake system that includes a dynamic brake grid and one or more cooling fans. The engine cooling system includes an engine cooling circuit having coolant passages internally disposed in the engine, and a radiator and radiator fans configured to receive coolant exiting the engine and return cooled coolant to the engine. An enhanced aftercooler cooling circuit is disposed in fluid communication with the engine cooling circuit and includes a heat exchanger arranged to receive coolant exiting the engine coolant passages, cool the coolant passing therethrough, and return cooled coolant to the aftercooler. The heat exchanger is advantageously positioned in a manner whereby the dynamic brake grid cooling fan is operatively associated with both the dynamic brake grid and the heat exchanger.

24 Claims, 4 Drawing Sheets

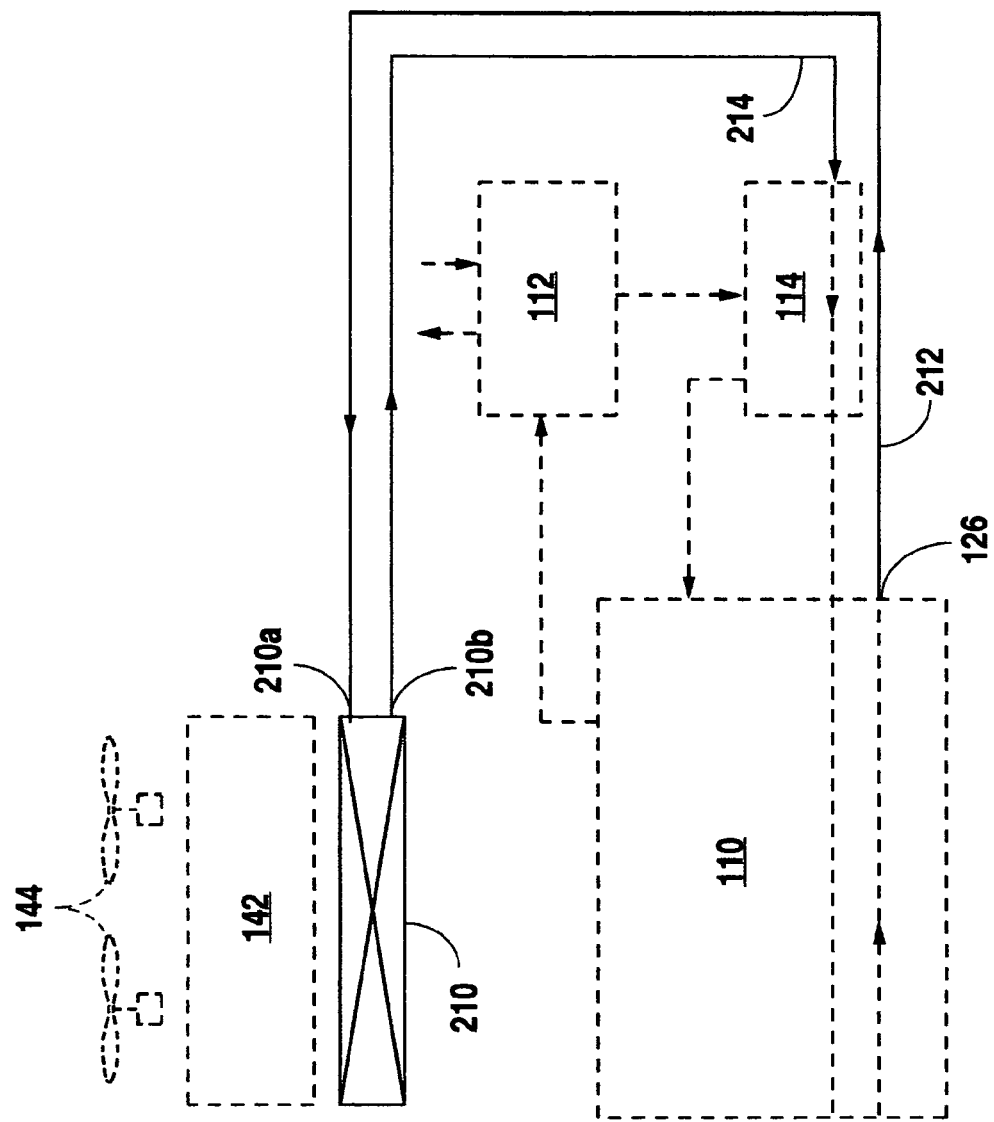
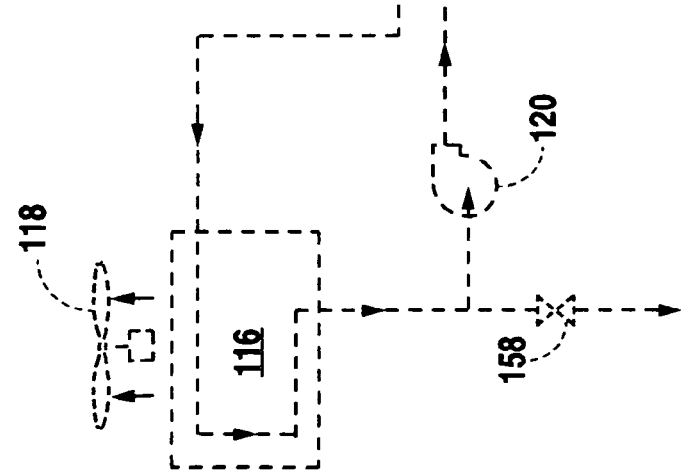
Fig. 2

LOCOMOTIVE ENGINE CHARGE AIR COOLING SYSTEM AND METHOD FOR COOLING THE ENGINE

This application claims the benefit of Ser. No. 60/551,258, filed Mar. 08, 2004.

BACKGROUND OF THE INVENTION

1. Technical Field

This invention relates generally to a cooling system and method for cooling a locomotive engine, and more particularly to such a cooling system for a locomotive engine having an aftercooler incorporated therewith.

2. Background Art

On Apr. 16, 1998, the Environmental Protection Agency (EPA) enacted emissions standards for newly manufactured and re-manufactured locomotive engines. Ultimately, all locomotives manufactured on or after 1973 will be required to meet the enacted emissions standards at the time of manufacture or re-manufacture. Exceptions are made to the following locomotives: electric locomotives; historic/steam powered locomotives; locomotives originally manufactured before 1973; and locomotives owned and operated by small railroads.

Three different sets of emissions standards have been adopted, with applicability of the standards dependent on the date a locomotive was first manufactured, as identified in Table 1 below. Locomotives manufactured after 1973 and not identified in the exceptions noted above, must also meet the smoke opacity limits identified in Table 2 below. Although the limits provided in Tables 1 and 2 are relatively higher than the limits provided by on-highway truck engine emission standards, it is expected that a significant reduction in NOx emissions from the status quo will result from implementation of the new standards.

TABLE 1

Emission Standards for Locomotives, (g/bhp · hr)

|  | HC* | CO | $NO_x$ | PM |
|---|---|---|---|---|
| Tier 0 (1973–2001) |  |  |  |  |
| Line-haul Duty Cycle | 1.0 | 5.0 | 9.5 | 0.60 |
| Switcher Duty Cycle | 2.1 | 8.0 | 14.0 | 0.72 |
| Tier 1 (2002–2004) |  |  |  |  |
| Line-haul Duty Cycle | 0.55 | 2.2 | 7.4 | 0.45 |
| Switcher Duty Cycle | 1.2 | 2.5 | 11.0 | 0.54 |
| Tier 2 (2005 and later) |  |  |  |  |
| Line-haul Duty Cycle | 0.3 | 1.5 | 5.5 | 0.20 |
| Switcher Duty Cycle | 0.6 | 2.4 | 8.1 | 0.24 |

*HC standard is in the form of THC for diesel engines

TABLE 2

Smoke Standards for Locomotives, % Opacity - Normalized

|  | Steady-state | 30-sec peak | 3-sec peak |
|---|---|---|---|
| Tier 0 | 30 | 40 | 50 |
| Tier 1 | 25 | 40 | 50 |
| Tier 2 | 20 | 40 | 50 |

An important technology employed to reduce NOx emissions on turbocharged engines, such as large Diesel engines used to drive a generator on Diesel-electric locomotives, is an aftercooler. An aftercooler is a heat exchanger, typically water-to-air, that is positioned between a compressed air discharge port of the compressor stage of a turbocharger and an intake manifold of the engine, and functions to reduce the temperature of the compressed intake, or boost, air discharged from the compressor section of the turbocharger. As a result of cooling the compressed intake air in the aftercooler prior to introduction into the intake manifold of the engine, the temperature of combustion, and consequently NOx formation, are advantageously reduced.

Heretofore, all turbocharged Diesel-electric locomotives are at least jacket-water aftercooled, and their radiators sized appropriately. Therefore, the same water that passes through the engine and the engine radiator also passes through the coolant passages of the aftercooler, resulting in the need for increased radiator and cooling fan size to dissipate the additional heat load attributed to the aftercooler.

U.S. Patent Application Publication No. 2002/0174653 published Nov. 28, 2002, for a LOCOMOTIVE ENGINE COOLING SYSTEM AND METHOD by Teoman Uzkan describes a separate circuit aftercooling system, which will provide lower charge air temperatures than provided by jacket-water cooled systems. However, the system proposed by Uzkan requires increased cooling capacity to cool the separate aftercooler cooling circuit. Such an arrangement could be integrated into new locomotives, but is impractical to retrofit into existing locomotives. Existing locomotive cooling systems have insufficient cooling capability to dissipate the increased heat load imposed by an additional aftercooler.

Another cooling arrangement, also found in newer Diesel locomotive engine designs, uses a dedicated aftercooler cooling system radiator separated from the engine cooling system radiator. In this arrangement, the aftercooler cooling circuit operates independently of the cooling circuit for the engine and uses a separate coolant, i.e., the aftercooler cooling circuit is not fluidly connected to the engine cooling system, and requires a radiator and electrically-driven fan system devoted solely to cooling fluid circulating in only the aftercooler cooling circuit. For example, U.S. Pat. No. 6,006,731 granted Dec. 28, 1999 to Teoman Uzkan for a LOCOMOTIVE ENGINE COOLING SYSTEM describes a locomotive engine cooling system having separate engine and aftercooler coolant loops with separate radiators and electrically-driven fans exclusively assigned to each of the loops. Such an arrangement can be readily incorporated in the design of a new locomotive, but, because of space limitations imposed when attempting to retrofit such a cooling system to existing locomotives, cannot be considered for application to existing locomotives. As noted above, when locomotives manufactured from 1973 through 2001 are overhauled, they must meet the Tier 0 emission requirements.

The present invention is directed to overcoming the problems set forth above with respect to providing enhanced aftercooler cooling circuits for existing turbocharged locomotives. It is desirable to have an aftercooler cooling circuit that does not require modification of an existing engine coolant radiator or enlargement of the cooling fan for the engine coolant radiator. It is also desirable to have an enhanced aftercooler cooling circuit that can be readily installed in the very limited space available in the car body of existing locomotives.

SUMMARY OF THE INVENTION

In accordance with one aspect of the present invention, an engine cooling system for a locomotive having an engine equipped with a compressor for compressing engine intake air, an aftercooler, and a dynamic braking system includes an engine cooling circuit and an aftercooler cooling circuit. The engine cooling circuit includes coolant passages in the engine and a radiator arranged to receive, cool and return coolant to the engine. The aftercooler cooling circuit has a coolant-to-air heat exchanger positioned in fluid-thermal communication with a dynamic brake grid cooling fan so that the brake grid cooling fan is operatively associated with both the dynamic brake grid and the aftercooler cooling circuit. The aftercooler cooling circuit also includes a heat exchanger inlet conduit providing fluid communication between the engine and the heat exchanger, a heat exchanger outlet conduit providing fluid communication between the heat exchanger and the aftercooler, and an aftercooler fluid conduit configured to pass coolant existing the aftercooler to the engine cooling circuit.

In another aspect of the present invention, a Diesel-electric locomotive includes a Diesel engine having a turbocharger, an aftercooler and a cooling system for cooling the engine and the aftercooler, and a dynamic brake system. The cooling system includes an engine cooling circuit and an aftercooler cooling circuit disposed in fluid communication with the engine cooling circuit, and has a coolant-to-air heat exchanger positioned upstream of the aftercooler in fluid-thermal communication with a dynamic brake grid cooling fan operatively associated with both the dynamic brake grid and the heat exchanger.

In still another aspect of the present invention, a method for cooling an engine of a locomotive having an engine and a dynamic brake system includes positioning a heat exchanger in fluid-thermal communication with a cooling fan of the dynamic brake system and providing an engine cooling circuit having a radiator. Coolant water is passed from the radiator into the inlet of the heat exchanger, then passed through the heat exchanger while the cooling fan of the dynamic brake system is operating and ambient air is drawn through the heat exchanger, thereby cooling the passing coolant water. The cooled coolant water is then passed from the heat exchanger into the aftercooler, then through the aftercooler into the engine cooling circuit and subsequently through the radiator of the engine cooling circuit.

In yet another aspect of the present invention, a method for retrofitting an existing locomotive to provide an enhanced aftercooler cooling circuit, in which the locomotive has an engine, an engine cooling system, a turbocharger, an aftercooler in fluid communication with the engine cooling circuit, and a dynamic brake system having a dynamic brake grid and at least one cooling fan, includes positioning a heat exchanger in fluid-thermal communication with the dynamic brake grid cooling fans in such a manner that the cooling fans draw ambient air past the dynamic brake grid and the heat exchanger. The method of retrofitting an existing locomotive also includes connecting an outlet of the engine coolant passages to an inlet of the heat exchanger and connecting an outlet of the heat exchanger to the aftercooler in such a manner as to pass cooled coolant water from the heat exchanger through the aftercooler and into the engine cooling system.

BRIEF DESCRIPTION OF THE DRAWINGS

A more complete understanding of the locomotive engine cooling system and method for cooling the engine, in accordance with the present invention, may be had by reference to the following detailed description when taken in conjunction with the accompanying drawings, wherein:

FIG. 2. is a simplified schematic of a retrofitted locomotive and cooling system in accordance with the present invention;

DETAILED DESCRIPTION OF THE INVENTION

Figure 1:
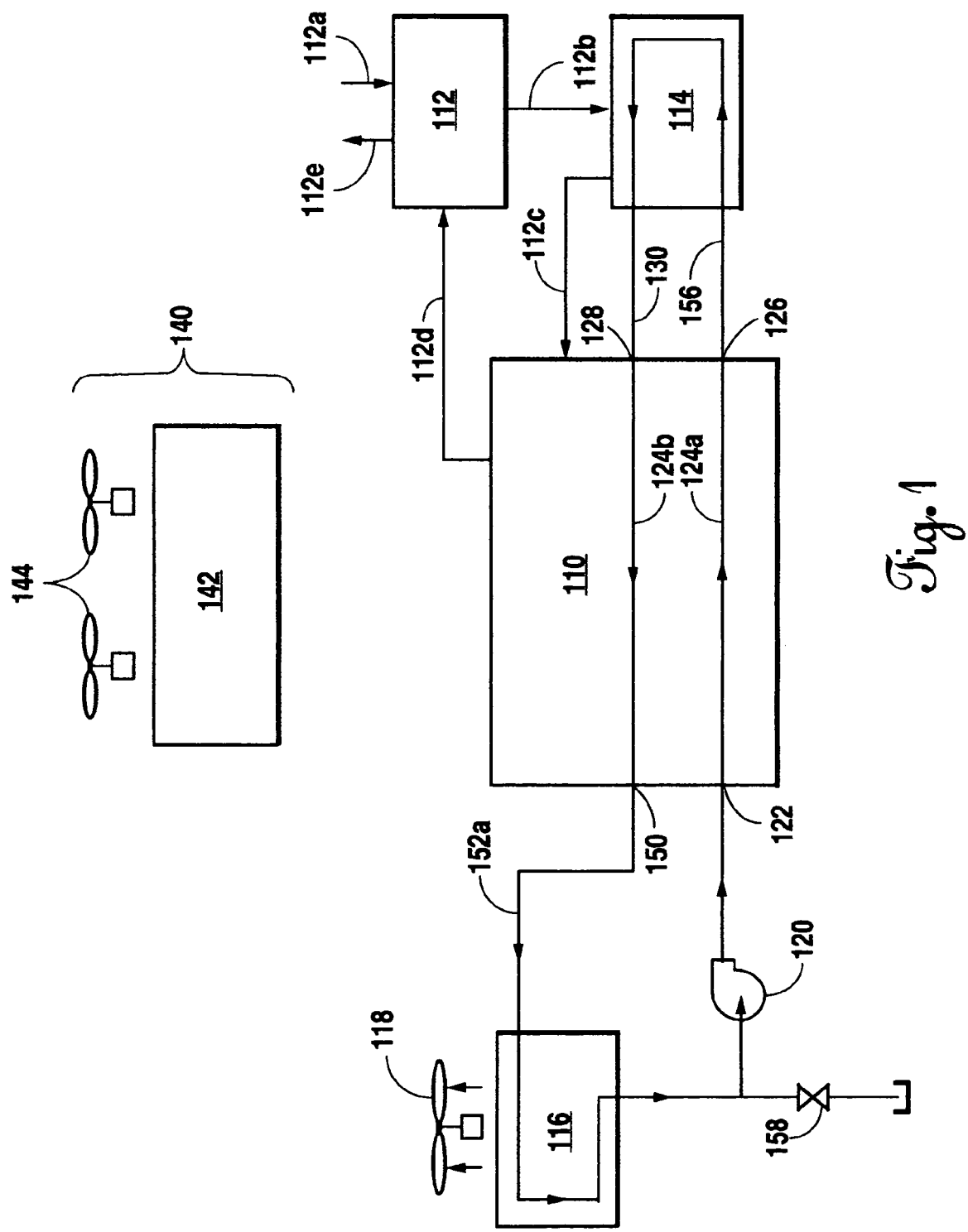
FIG. 1 is a simplified schematic of a prior art Diesel locomotive and cooling system.
Figure 3:
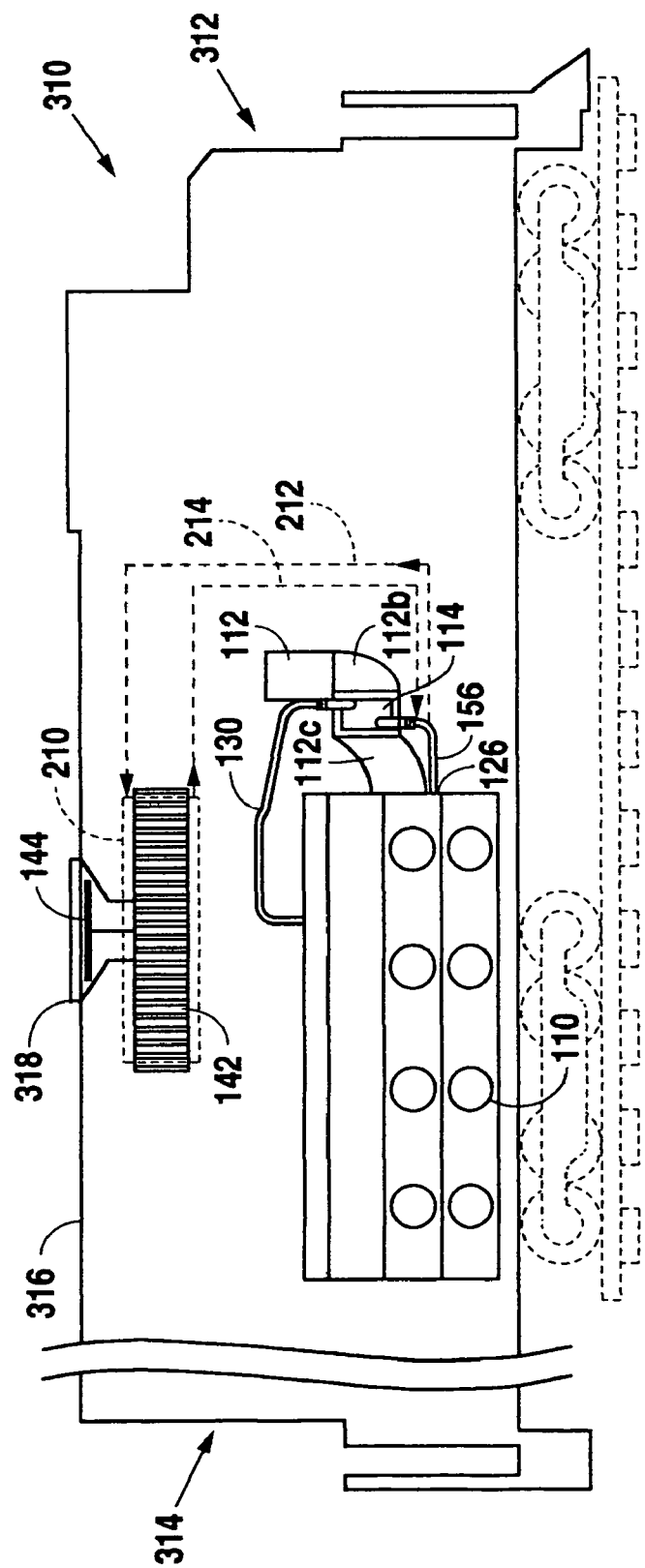
FIG. 3 is a side view of a portion of a locomotive retrofitted in accordance with the present invention.
Figure 4:
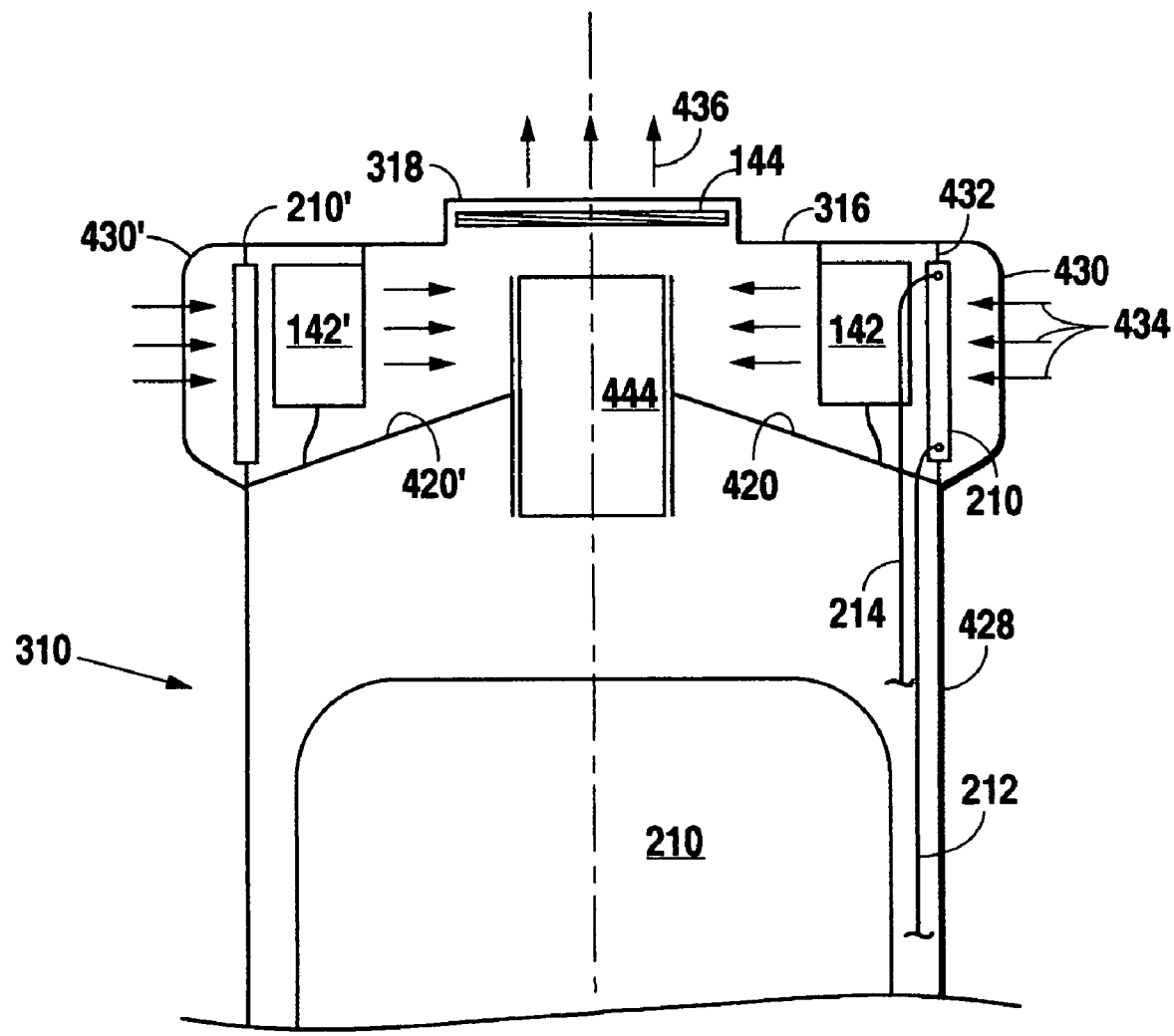
FIG. 4 is a partial sectional view of the locomotive illustrated in FIG. 3.

FIG. 1 illustrates a typical arrangement of certain components of a prior art locomotive having a Diesel engine 110 and a cooling system. In one aspect of the present invention, a method for retrofitting a Diesel locomotive, such as that represented in FIG. 1, to provide a cooling system having an improved aftercooler cooling circuit is illustrated in FIGS. 2–4. As described below in detail, the locomotive engine cooling system and method for cooling the engine in accordance with the present invention are particularly suited for use in retrofitting an existing locomotive engine. More particularly, the present invention is suited for retrofitting a Diesel-electric locomotive, such as GM EMD 40, 50, 60, and 70 Series locomotives manufactured by General Motors Corporation. The present invention is also applicable to other diesel-electric powered prime movers, such as large mining trucks, that have dynamic braking systems similar to those used on locomotives.

Although specifically directed retrofitting existing Diesel-electric locomotive engines, various aspects of the present invention are also applicable to other internal combustion engines and commercially manufactured locomotives and prime movers. Also, the present invention is equally applicable to new locomotives and locomotive engines.

In FIG. 1, a Diesel-electric locomotive representative of the prior art has a Diesel engine 110 equipped with a turbocharger 112, or other intake air compression means, and a pair of aftercoolers 114, both operatively associated with the engine 110. The engine 110 includes an engine cooling system for circulating coolant water through each of two banks (left and right) of the engine 110 during engine operation. FIG. 1 illustrates only one side of or bank of engine 110 and thus, shows only one bank or side of the engine cooling system. The engine cooling system employs one or more radiators 116, each having an electrically-driven cooling fan 118 positioned in fluid communication with a centrifugal pump 120 that directs the coolant water through the engine 110 and subsequently circulated back to the radiator 116. More specifically, hot water exits the engine 110 at a first engine coolant outlet port 150 and passes into the radiator 116 by way of a fluid conduit 152a. Cooled water is drawn from the radiator 116, by operation of the pump 120 and associated fluid conduits into a first engine coolant inlet port 122 of the engine 110. The engine 110 is equipped with coolant passages 124a, 124b, through which the water circulates and by which heat is transferred from the engine 110 into the circulating coolant water.

A second engine coolant outlet port 126 and a fluid conduit 156 fluidly connect the coolant passages 124a of the engine 110 with the coolant passages of the aftercooler 114. The aftercooler 114 circulates the water to convectively communicate with hot compressed air discharged from the compressor stage of a turbocharger 112 before returning the coolant water to the cooling system of the engine 110 by way of a fluid conduit 130 and a second engine coolant inlet port 128. From the engine coolant passages 124b, the hot coolant water is then recirculated through the radiator 116.

In a typical engine cooling system, a low point in the system is equipped with a water dump valve 158, as shown in FIG. 1. The dump valve 158 is preferably temperature controlled to activate draining of the cooling system when the water temperature falls below a preselected temperature. For example, the dump valve 158 may be set to activate, i.e., open, when the water temperature falls below 40° F. to prevent freeze damage when the engine is not running.

The turbocharger 112 has a compressor stage that compresses intake air prior to introduction into the intake manifold of the engine 110. The turbocharger 112 includes an ambient air intake port 112a, a compressed intake air conduit 112b that passes the compressed intake air into the aftercooler 114, and a cooled compressed intake air conduit 112c. More specifically, the aftercooler 114 cools the compressed intake air received from the turbocharger 112 and then passes the cooled compressed intake air into the intake manifold of the engine 110 through the cooled compressed air conduit 112c. Typically, depending on the ambient air temperature and the amount of compression, the compressed intake air temperatures may be as high as about 350° F. (at rated power) when discharged from the compressor stage of the turbocharger 112. The coolant water temperature entering the aftercooler 114 is generally maintained at a temperature of about 175° F. Through operation of the aftercooler 114, the compressed intake air temperature may be reduced to about 190° F. (at rated power) before entering the intake manifold of the engine 110. The reduction in temperature of the intake air also provides a reduction of the temperature in the cylinders and a further reduction in $NO_x$ emissions.

The engine 110 also includes an exhaust conduit 112d that communicates exhaust gases discharged from the engine 110 into the turbocharger 112, and the turbocharger has an exhaust discharge outlet 112e.

In addition to the engine 110, the locomotive has a dynamic brake electrical load dissipation system 140 that includes a dynamic brake grid 142 and one or more electrically-driven cooling fans 144. The dynamic brake system 140 supplements operation of the locomotive air brake system. Briefly, during dynamic braking, the traction motors, not shown, of the locomotive are driven by the locomotive wheels and function as generators, thereby converting kinetic energy of the moving locomotive into electrical energy. The resulting electrical power is routed to the dynamic brake system 140 where it is dissipated as heat energy through electrically resistant grids in the dynamic brake grid 142. The cooling fans, or blowers, 144 force cooler ambient air over the dynamic brake grid 142 thereby effecting convective heat transfer. The heated air is then exhausted through the roof of the locomotive. Typically the dynamic brake system is positioned in the car body above, or near, the engine 110.

FIG. 2 illustrates a cooling system for the locomotive engine 110 in accordance with the present invention. As discussed below, the cooling system embodying the present invention may be referred to as having two cooling circuits: an engine cooling circuit similar to that provided by the system in FIG. 1, and an aftercooler cooling circuit. For purposes of the present description, the engine cooling circuit includes, among other components, the engine radiator 116, the water pump 120, the dump valve 158, the engine coolant passages 124a, 124b, and associated piping. In the illustrative preferred embodiment of the present invention, the cooling apparatus embodying the present invention is provided as a retrofit modification of the existing Diesel locomotive engine 110 illustrated in FIG. 1.

As used herein, the term "retrofit" refers to a new installation of an enhanced aftercooler cooling circuit on an existing engine cooling system as illustrated in FIG. 1. In FIG. 2, the retrofit installation on the engine 110 is indicated by solid lines, whereas the existing or original installation is indicated by dash lines.

Referring to FIG. 2, the aftercooler cooling circuit of the cooling system embodying the present invention includes an added, dedicated heat exchanger 210 that cools engine-heated coolant water before circulation through the aftercooler 114. The aftercooler cooling circuit preferably includes a heat exchanger supply conduit 212 extending from the existing engine outlet 126 to an inlet port 210a of the heat exchanger 210. The aftercooler cooling circuit embodying the present invention further includes a heat exchanger discharge conduit 214 extending from an outlet port 210b of the heat exchanger 210 to the aftercooler 114. Thus, the aftercooler cooling circuit redirects coolant water from the engine 110, typically having a temperature of about 170° to 175° F., into the air-water heat exchanger 210 for additional cooling, rather than directly to the aftercooler 214.

In the preferred embodiment of the present invention, the engine cooling system uses the existing cooling fans 144 of the dynamic brake system 140 to operate in conjunction with the heat exchanger 210. The coolant fans 144 draw ambient air through the heat exchanger 210, thereby reducing the coolant temperature from about 175° F. to a temperature typically in the neighborhood of about 20° F. above ambient temperature. Preferably, the coolant water temperature is reduced to a temperature between about 90° F. and 125° F., prior to introduction into the aftercooler 14.

An important feature of the present invention is that no additional cooling fans are required. When dynamic brake grid cooling is required during braking there is no requirement for enhanced charge air cooling by the aftercooler. Moreover, when enhanced charge air cooling is required there is no demand for dynamic brake grid cooling. Thus, the requirement for dynamic brake grid cooling and the requirement for enhanced charge air cooling are mutually exclusive and, accordingly, the existing dynamic brake grid cooling fans can advantageously be used when not needed for brake grid cooling to cool water passing through the aftercooler cooling circuit The cooled coolant water passing through the aftercooler 114, advantageously reduces the temperature of the compressed intake air entering the intake manifold to a temperature of, for example, about 150° F., as opposed to a low temperature of about 190° F. with the prior art. The cooler compressed intake air reduces the temperature inside the engine cylinders, including the peak temperature. As a result, the amount of $NO_x$ generated during the combustion process is reduced.

As illustrated in FIG. 2, the retrofit cooling system embodying the present invention uses the existing engine cooling circuit as well as the new retrofit components of the aftercooler cooling circuit. The retrofit aftercooler cooling circuit uses the same coolant water as that circulated through the engine 110. Moreover, the cooling system embodying the present invention uses the existing engine-driven pump 120 to direct coolant water through the engine 110, the added heat exchanger 210, the aftercooler 114, and the engine radiator 116. Typically, the engine-driven water pump 120 is sufficiently sized to handle fluid flow through the additional components and piping of the retrofit cooling system embodying the present invention. The piping configuration required by the retrofit installation is relatively small because, in existing locomotives, the dynamic brake system 140 is typically located in the car body above, or near, the existing engine and aftercooler 14. Thus, the length of the fluid conduits 212, 214, between the engine area and the added heat exchanger 210 is relatively short and, therefore, the pressure differential across the aftercooler cooling circuit is minimized.

Existing locomotive engine designs preclude the use of coolant other than water. Preventive means are, therefore, implemented to guard against freezing within the engine cooling system. Another advantage provided by the cooling system embodying the present invention is that it provides means for eliminating and/or otherwise reducing the possibility of the coolant water freezing in the aftercooler cooling circuit. First, the engine driven water pump 120 continuously provides coolant water flow in the aftercooler cooling circuit as well as the engine cooling circuit when the engine is running. Secondly, the coolant water that is pumped into the aftercooler cooling circuit comes from the engine 110, and thus it is at or near engine temperature, which is always well above the freezing temperature of water. This is true even when the engine 110 is operating at light load or is idling. Thirdly, the aftercooler cooling circuit is fluidly connected to the engine water dump system and the water dump valve 158. As discussed above, the dump valve 158 is designed to drain all of the engine's cooling water in the event that the water temperature drops below, for example, 40° F. Draining of the fluid conduits 212, 214 and the heat exchanger 210 is further facilitated because these components are positioned at or above the low point of the engine 110 and well above the dump valve 158. Integration of the engine water dump system into the cooling apparatus therefore alleviates freeze protection concerns when the engine is not operating.

Another important aspect of the cooling system embodying the present invention is that the aftercooler cooling circuit, particularly the aftercooler fans 144, do not add significant parasitic load on the engine 110 or the locomotive. Operation of the separate circuit aftercooler cooling circuit actually reduces the load on the existing cooling system and the engine's oil cooling system because the aftercooler cooling circuit provides for cooler compressed intake air introduced into the engine 110. The cooler compressed intake air results in a reduction of heat generated in the engine, thereby resulting in a reduction in the heat dissipation requirements imposed on engine cooling circuit and engine lubricating oil. As a result, the existing radiator fans 118 for the existing engine cooling circuit will do less work.

FIG. 3 is a simplified illustration of an engine compartment 310 of the locomotive driven by the Diesel engine 110. The engine compartment 310 has a front end 312, a back end 314, all-around walls (not shown), and a roof 316. To facilitate the description of the present invention, only certain components of the engine 110 and the engine compartment 310 are shown. The retrofit installation of the aftercooler cooling circuit supply and return conduits 212, 214 in accordance with the present invention is indicated by dash lines in FIG. 3 to distinguish the retrofit installation from the existing, or original, installation.

In typical locomotive designs, the turbocharger 112 and the aftercooler 114 are situated toward the front end 312 of the engine compartment 310. Also, the dynamic brake grid 142 and the cooling fans 144 are typically positioned directly and conveniently above the engine 110. The dynamic brake cooling fans 144 are supported within a shroud 318 on the roof 316. As illustrated in FIG. 3, the existing engine coolant outlet port 126 and the fluid conduit 156 fluidly connects the coolant passages in the engine 110 with the aftercooler 214. In the retrofit installation embodying the present invention, the original fluid conduit 156 is replaced by the heat exchanger supply conduit 212 which extends upwardly from the engine coolant outlet port 126 to the heat exchanger 210 positioned above the engine 110, and the heat exchanger discharge, or coolant return, conduit 214. The heat exchanger discharge conduit 214 extends downwardly from the heat exchanger 210 to the aftercooler 114. Because the cooling fans 144 are located only a short distance from the engine coolant outlet port 126 and the aftercooler 114, the fluid conduits 212, 214 are relatively short in length.

As mentioned above with respect to FIGS. 1 and 2, FIG. 3 also shows only a portion of the cooling system embodying the present invention. A second cooling circuit is provided on the opposite side of the engine, not shown, and includes a second aftercooler, a second heat exchanger, and connecting supply and return conduits.

In accordance with the present invention, the cross-sectional view shown in FIG. 4 illustrates components of both aftercooler cooling circuits. Specifically, FIG. 4 shows both heat exchangers 210, 210', heat exchanger supply conduits 212, 212', and heat exchanger return conduits 214, 214' respectively positioned on left and right sides of the engine 210.

Typically, the engine compartment 310 has upwardly extending walls 428 that meet with the roof 316 to enclose the engine 110. Each wall 428 has a modified intake hatch with louvered covers 430, 430' designed for the intake of ambient air 434 during operation of the dynamic brake grid cooling fans 144. On existing installations, the wall 428 has louvered hatch covers that are situated inwardly from the position of the modified louvered hatch covers 430, 430' and, therefore, do not extend outwardly as indicated by the modified louvered hatch covers. The existing, or original, louvered hatch covers are typically positioned where heat exchanger supports 432 are indicated. Thus, the modified louvered hatch covers 430, 430' create an expanded areas in which the heat exchangers 210, 210' may be conveniently mounted for optimum heat transfer between the heat exchangers 210, 210' and the flow of ambient air 434.

As illustrated in FIG. 4, the heat exchangers 210, 210' are mounted in a vertical position between respective louvered hatch covers 430, 430' and dynamic brake grids 142, 142'. Moreover, inclined duct walls 420, 420' respectively direct the airflow 434 through the dynamic brake grids 142, 142' and the heat exchangers 210, 210'. The duct wall 420, 420' also deflect the hot air flow 436 through the fan 144 and the shroud 318, and then outwardly into the atmosphere. The inclined duct walls 420, 420' define, in cooperation with the louvered hatch covers 430, 430', respective airflow paths for ambient air through the heat exchangers 210.210' and associated dynamic brake grids 142. 142'.

Operation of the existing dynamic brake grid cooling fans 144 is provided by an existing DC powered motor 444 centrally supported between the inclined walls 420, 420' at a position directly above the engine 210. It will be apparent to one skilled in the art that suitable controls may be implemented for operation of the motor 444 so as to control the speed of the cooling fans 144, as required by load demands on the separate circuit aftercooler heat exchangers 142, 142'. For example, at relatively low ambient temperatures, the heat transfer required between the coolant water and the aftercooler 114 may not be as great as it would be at higher ambient temperatures. In such conditions, one or more cooling fans 144 may be shut down, or one or more fans 144 may be operated at less than full or normal speed, to provide a predetermined desirable intake manifold air temperature.

Various embodiments of the present invention have been described herein. It should be understood by those of ordinary skill in the relevant mechanical art that the above-described embodiments, such as the cooling system specifically designed for a Diesel locomotive engine, are set forth merely by way of example and should not be interpreted as limiting the scope of the invention, which is defined by the appended claims. For purposes of this invention, the term "locomotive" as used herein includes all vehicles, such as large mining trucks, that have similar dynamic braking systems. Other alternative embodiments, variations and modifications of the foregoing embodiments that embrace various aspects of the invention will be understood upon a reading of the detailed description, in light of the prior art. For example, it will be understood that application of the various aspects of the cooling system may be applied to different types of engines, or other types of Diesel locomotive engines with or without the turbocharger, for example, using other compressor means and the aftercooler system described herein. The various types of configurations described here may be combined with features or other embodiments or many other features may be omitted or replaced.

What is claimed is:

1. An engine cooling system for a locomotive having an engine equipped with a compressor for compressing engine intake air, an aftercooler for cooling the compressed engine intake air, and a dynamic braking system having a dynamic brake grid and at least one cooling fan positioned in fluid-thermal communication with the dynamic brake grid, said engine cooling system comprising:
    an engine cooling circuit having coolant passages in the engine and a radiator configured to receive coolant exiting the engine and return cooled coolant to the engine; and
    an aftercooler cooling circuit having a coolant-to-air heat exchanger disposed in fluid-thermal communication with said at least one dynamic brake grid cooling fan such that said brake grid cooling fan is operatively associated with both the dynamic brake grid and the heat exchanger, a heat exchanger coolant supply conduit providing fluid communication between said engine and the heat exchanger, a heat exchanger coolant return conduit providing fluid communication between said heat exchanger and the aftercooler, and an aftercooler fluid conduit configured to pass coolant exiting the aftercooler to said engine cooling circuit.

2. The engine cooling system, as set forth in claim 1, wherein said engine cooling circuit includes a pump operatively positioned to direct coolant to the engine cooling circuit and to the aftercooler cooling circuit.

3. The engine cooling system, as set forth in claim 2, wherein said pump is an engine driven pump adapted to circulate coolant water through said engine cooling circuit and the aftercooler cooling circuit.

4. The engine cooling system, as set forth in claim 1, wherein said engine cooling circuit includes a water dump valve adapted to drain said engine cooling circuit and said aftercooler cooling circuit of coolant water upon indication of a preselected water temperature.

5. The engine cooling system, as set forth in claim 1, wherein said aftercooler cooling circuit is a retrofit installation on the locomotive.

6. The engine cooling system, as set forth in claim 1, wherein said heat exchanger is positioned relative to the dynamic brake grid and the cooling fan such that the cooling fan is operable to draw ambient air past said heat exchanger and the dynamic brake grid effect convective heat transfer therewith.

7. The engine cooling system, as set forth in claim 1, wherein the locomotive includes an air intake hatch disposed in fluid communication with ambient air and positioned relative to the cooling fan and the dynamic brake grid so as to define a flow path interconnecting the intake hatch, the dynamic brake grid and the cooling fan, said heat exchanger being positioned in the flow path intermediate the air intake hatch and the cooling fan such that operation of the cooling fan draws ambient air through the intake hatch, the heat exchanger and the dynamic brake grid.

8. A diesel-electric locomotive, comprising a diesel engine having a turborcharger for compressing intake air, an aftercooler for cooling the intake air, and a cooling system for cooling said engine and said aftercooler; a dynamic brake system including a dynamic brake grid and at least one cooling fan positioned for fluid thermal communication with said dynamic brake grid, wherein said cooling system includes;
    an engine cooling circuit having coolant passages in the engine and a radiator configured to receive coolant water exiting the engine and returning cooled coolant water to the engine; and
    an aftercooler cooling circuit disposed in fluid communication with said engine cooling circuit and having a coolant-to-air heat exchanger positioned to cool coolant water upstream of said aftercooler, wherein said heat exchanger is positioned for fluid-thermal communication with said dynamic brake grid cooling fan such that said cooling fan is operatively associated with both the dynamic brake grid and said heat exchanger.

9. The locomotive, as set forth in claim 8, wherein said engine cooling circuit includes a pump operatively positioned to direct coolant water from said radiator to said engine cooling circuit and to said aftercooler cooling circuit.

10. The locomotive, as set forth in claim 9, wherein said pump is an engine driven pump adapted to circulate coolant water through said engine cooling circuit and said aftercooler cooling circuit.

11. The locomotive, as set forth in claim 8, wherein said engine cooling circuit includes a water dump valve adapted to drain said engine cooling circuit of coolant water upon indication of a preselected water temperature, said aftercooler cooling circuit being positioned higher than said water dump valve such that said water dump valve is operable to drain said aftercooler cooling circuit upon said indication of a preselected water temperature.

12. The locomotive, as set forth in claim 8, wherein said aftercooler cooling circuit is a retrofit installation on said engine and said engine cooling circuit is an existing installation.

13. The locomotive, as set forth in claim 8, wherein said locomotive has an air intake hatch disposed in fluid communication with ambient air and positioned relative to said cooling fan and said dynamic brake grid so as to define a flow path interconnecting said air intake hatch, said dynamic brake grid, and said cooling fan, said heat exchanger being positioned in said flow path intermediate said air intake hatch and said cooling fan such that operation of said cooling fan draws ambient air through said air intake hatch and through said heat exchanger.

14. The locomotive, as set forth in claim 8, wherein said aftercooler cooling circuit includes a coolant supply conduit extending from said engine to said heat exchanger and a coolant return conduit extending from said heat exchanger to said aftercooler.

15. A method of cooling an engine of a locomotive having an engine and a dynamic brake electrical load dissipation system, said engine having a turbocharger arranged to compress intake air and an aftercooler adapted to cool the compressed air, said dynamic brake electrical load dissipation system having a dynamic brake grid and at least one cooling fan positioned for fluid-thermal communication with the dynamic brake grid, said method comprising:
    positioning a heat exchanger in thermal-fluid communication with the cooling fan of the dynamic brake electrical load dissipation system;
    providing an engine cooling circuit that includes a radiator and coolant passages in the engine;
    passing coolant water from the radiator to the coolant passages in the engine and then into an inlet port of the heat exchanger;
    passing the coolant water through the heat exchanger while the cooling fan is operating, such that ambient air is drawn through the heat exchanger, thereby cooling the passing coolant water;
    passing the cooled coolant water from the heat exchanger and into the aftercooler, whereby the compressed intake air passing through the aftercooler from the turbocharger is cooled prior to introduction of the compressed intake air into the engine;
    passing the coolant water from the aftercooler into the coolant passages in the engine, thereby returning the coolant water into the engine cooling circuit; and
    passing the coolant water through the radiator after the coolant water passes through the coolant passages of the engine.

16. The method, as set forth in claim 15, wherein said method comprises re-circulating the coolant water through the engine cooling circuit and the heat exchanger.

17. The method, as set forth in claim 15, wherein said step of passing coolant water from the radiator to the engine includes operating a pump operatively positioned to direct coolant water from the radiator through the engine coolant passages, the heat exchanger and the aftercooler.

18. The method of claim 15, wherein the step of passing coolant water through the heat exchanger is performed while the dynamic brake cooling fan is operating and the dynamic brake electrical load dissipation system is idle.

19. The method, as set forth in claim 18, wherein the step of passing coolant water through the heat exchanger is performed while the dynamic brake grid cooling fan draws ambient air through the dynamic brake grid and the heat exchanger.

20. The method, as set forth in claim 15, wherein the step of passing coolant water through the heat exchanger includes reducing the temperature of the passing coolant water by at least from about fifty to eighty-five degrees Fahrenheit.

21. The method, as set forth in claim 20, wherein said step of passing coolant water through the heat exchanger reduces the temperature of the passing coolant water to within about twenty to thirty degrees above an ambient temperature.

22. A method for retrofitting a locomotive to provide an aftercooler cooling circuit, said locomotive having an engine equipped with an engine cooling system having internally disposed coolant passages in the engine, a turbocharger, an aftercooler in fluid communication with the engine cooling system, and a dynamic brake system having a dynamic brake grid and at least one cooling fan positioned in fluid-thermal communication with the dynamic brake grid, said method comprising;
    positioning a heat exchanger in fluid-thermal communication with the cooling fan of the dynamic brake system, such that the cooling fan draws ambient air past the dynamic brake grid and the heat exchanger;
    connecting a coolant outlet port from the engine coolant passages to a coolant supply port of the heat exchanger whereby coolant exiting the engine is directed into the heat exchanger;
    connecting a coolant return port of the heat exchanger with the aftercooler, whereby cooled coolant water exiting the heat exchanger is directed into the aftercooler and then into the engine cooling system.

23. The method, as set forth in claim 22, wherein the locomotive includes a louvered air intake hatch through which ambient air is drawn, the dynamic brake grid being positioned between the louvered air intake hatch and the cooling fan, and said positioning the heat exchanger includes positioning the heat exchanger between the louvered air intake hatch and the dynamic brake grid.

24. The method, as set forth in claim 23, wherein said positioning the heat exchanger includes enlarging the louvered air intake hatch to accommodate the heat exchanger.

* * * * *